United States Patent [19]

Shie

[11] Patent Number: 5,139,439
[45] Date of Patent: Aug. 18, 1992

[54] PORTABLE COMPUTER WITH DETACHABLE CARTRIDGE TYPE INTERFACE DEVICE

[75] Inventor: Alen Shie, Taipei, Taiwan

[73] Assignee: Veridata Electronics Inc., Taipei, Taiwan

[21] Appl. No.: 730,648

[22] Filed: Jul. 16, 1991

[51] Int. Cl.$^5$ .......................... H01R 25/00; H05K 5/02
[52] U.S. Cl. ..................... 439/359; 361/399; 364/708; 439/638; 439/928
[58] Field of Search ............... 439/55, 61, 76, 374, 439/377, 359, 638, 923, 483, 928; 364/708; 361/380, 391, 393, 394, 395, 399

[56] References Cited

U.S. PATENT DOCUMENTS

| | | | |
|---|---|---|---|
| 4,002,892 | 1/1977 | Zielinski | 364/708 |
| 4,399,487 | 8/1983 | Neumann | 361/394 |
| 4,715,385 | 12/1987 | Cudahy et al. | 364/708 |
| 4,821,150 | 4/1989 | Duthie et al. | 361/395 |
| 4,858,162 | 8/1989 | Kieffer et al. | 364/708 |
| 5,032,951 | 7/1991 | Schropp et al. | 439/377 |
| 5,058,045 | 10/1991 | Ma | 361/393 |

*Primary Examiner*—Neil Abrams
*Attorney, Agent, or Firm*—Finnegan, Henderson, Farabow, Garrett & Dunner

[57] ABSTRACT

The portable computer has a computer casing provided with a rectangular receiving space accessible from one side thereof, and a socket connector projecting inwardly into the receiving space from an innermost end of the receiving space and being electrically connected to the internal circuitry confined by the computer casing. A detachable cartridge type interface device has a rectangular casing detachably provided in the receiving space of the computer casing, and an interface card confined inside the rectangular casing. The rectangular casing has a rear end provided with a rectangular opening to access one end of the interface card. The socket connector extends into the rectangular opening to engage the interface card so as to electrically connect the same to the internal circuitry. The front end of the rectangular casing is provided with a socket to permit electrical connection of the portable compute with an external device.

1 Claim, 4 Drawing Sheets

PORTABLE COMPUTER WITH DETACHABLE CARTRIDGE TYPE INTERFACE DEVICE

BACKGROUND OF THE INVENTION

1. Field of the Invention This invention relates to a portable computer, more particularly to a portable computer with a detachable cartridge type interface device to permit the portable computer to achieve a wide variety of functions without increasing its size.

2. Description of the Related Art Presently, computers are in widespread use because of the conveniences they bring. Among the many types of computers available, the personal computer is generally preferred by most students and offices because of its relatively small size and affordable price. However, the personal computer is relatively heavy and cannot be conveniently carried. This led to the development of smaller portable computers which are lighter and which can be conveniently carried. Examples of existing portable computers include notebook and laptop computers. Because the size of the portable computer has been reduced, its functions are correspondingly limited. To achieve additional functions, the portable computer must be provided with an interface card connector so that the portable computer may be used with a mouse, a modem, etc. FIG. 1 is an illustration of the computer casing (A) of a conventional portable computer with detachable interface card. The computer casing (A) is substantially L-shaped and has a central processing unit (CPU) receiving space (A1) and an interface card receiving space (A2). A first socket connector means (A3) is mounted on the computer casing (A) at a rear end of the CPU receiving space (A1) and is electrically connected to the CPU (not shown). A second socket connector means (A4) is electrically connected to the first socket connector means (A3) and is provided in the interface card receiving space (A2). A lid (A5) is hinged on an open top end of the interface card receiving space (A2). Note that while the portable computer incorporating the computer casing (A) can achieve additional functions, its size is correspondingly increased because of the presence of the interface card receiving space (A2).

SUMMARY OF THE INVENTION

Therefore, the main objective of the present invention is to provide a portable computer with a detachable cartridge type interface card so as to permit the portable computer to achieve a wide variety of functions without increasing its size. Accordingly, the preferred embodiment of a portable computer of the present invention has a computer casing and a socket connector provided on the computer casing and electrically connected to the internal circuitry confined by the computer casing. The computer casing is provided with a rectangular receiving space accessible from one side thereof. The socket connector projects inwardly into the receiving space from an innermost end of the receiving space. A detachable cartridge type interface device has a rectangular casing with a size corresponding to that of the receiving space. The rectangular casing confines an interface card therein and has a rear end provided with a rectangular opening that is aligned with one end of the interface card. The socket connector extends into the rectangular opening so as to engage one end of the interface card and electrically connect the interface device to the internal circuitry. The front end of the rectangular casing is provided with a socket means to permit electrical connection of the portable computer with an external device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
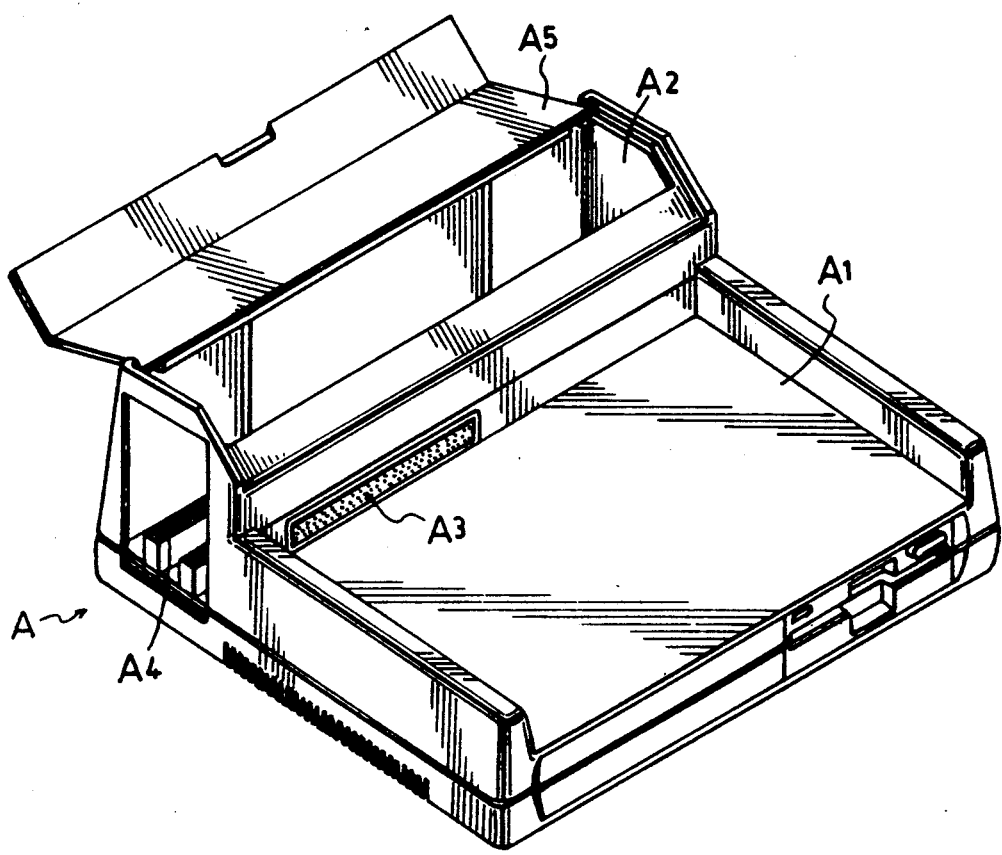
FIG. 1 is a perspective view of the computer casing of a conventional portable computer with detachable interface card.
Figure 2:
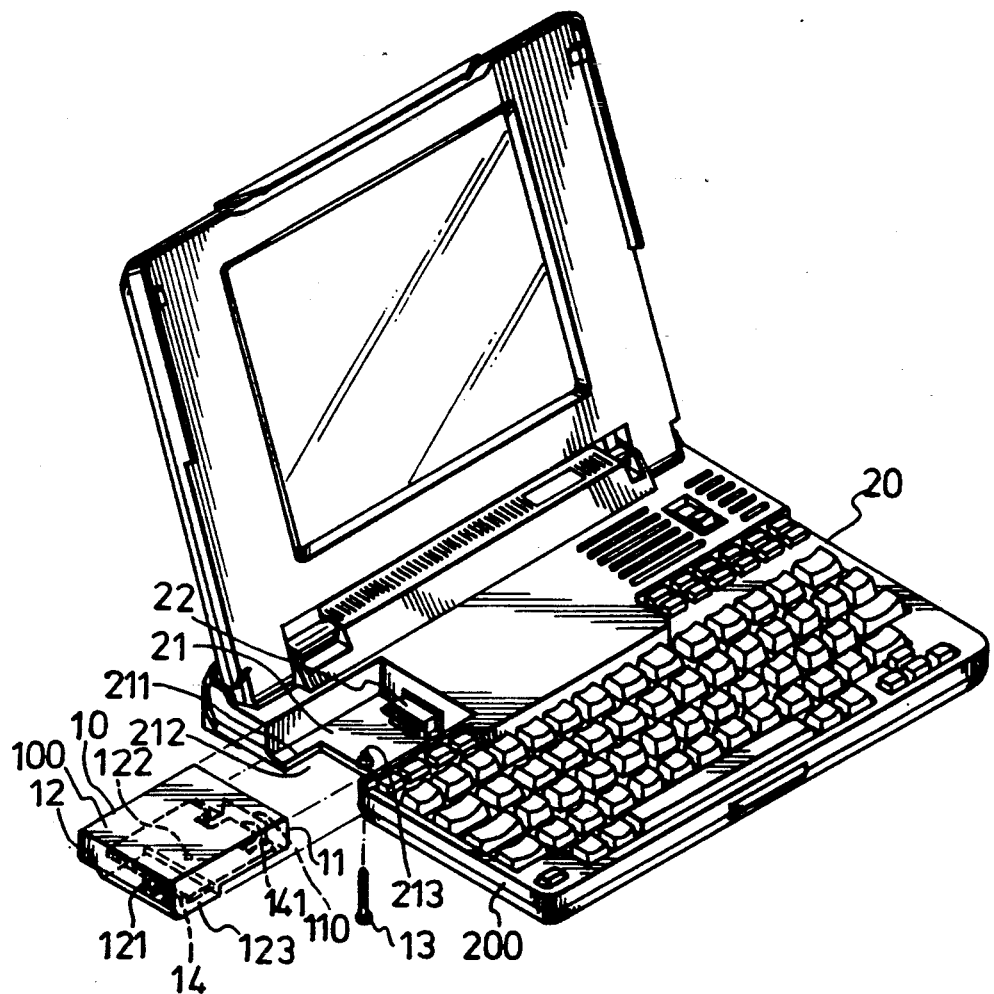
FIG. 2 is a partially exploded view of the preferred embodiment of a portable computer with detachable cartridge type interface device according to the present invention.
Figure 3:
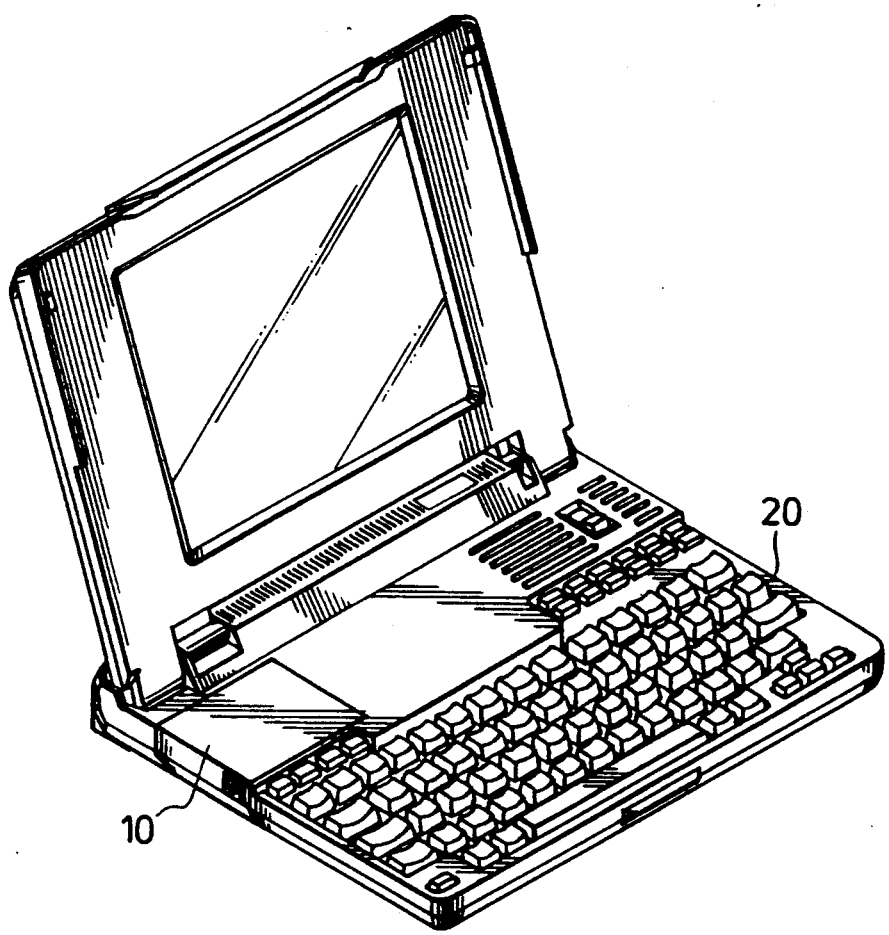
FIG. 3 is a perspective view of the preferred embodiment illustrating its assembly.

The preferred embodiment of a portable computer with detachable cartridge type interface device is shown in FIG. 2. The portable computer 20 has a computer casing 200 provided with a rectangular receiving space 21 accessible from one side thereof to receive the detachable cartridge type interface device 10. A socket connector 22 projects inwardly into the receiving space 21 from an innermost end of the receiving space 21 and is electrically connected to the internal circuitry (not shown) confined by the computer casing 200 of the portable computer 20. A base plate 211 is disposed on a bottom end of the receiving space 21. The base plate 211 has a rectangular notch 212 opening from the outermost end of the receiving space 21, and a threaded opening 213 disposed adjacent to the rectangular notch 212. The interface device 10 has a rectangular casing 100, the size of which corresponds with that of the receiving space 21. The rear end 11 of the casing 100 is provided with a rectangular opening 110. One end 141 of an interface card 14 confined inside the casing 100 is aligned with the rectangular opening 110. The front end 12 of the casing 100 is provided with a socket means 121 to permit electrical connection of the portable computer 20 with an external device. The bottom wall of the casing 100 is provided with a threaded opening 122 to be aligned with the threaded opening 213 of the base plate 211 A bolt member 13 threadedly extends into the threaded openings, 213 and 122, to lock the interface device 10 onto the portable computer 20. The bottom wall of the casing 100 is provided with a downwardly extending projection 123 to be slidingly received in the notch 212 of the base plate 21. This facilitates the drawing of the interface device 10 away from the portable computer 20 when replacing the interface device 10. Referring to FIGS. 2 and 3, when the interface device 10 is attached to the portable computer 20, the socket connector 22 extends into the rectangular opening 110 to engage the end 141 of the interface card 14 so as to electrically connect the interface card 14 and the internal circuitry confined by the computer casing 200. The interface device 10 can be a mouse pad interface device, a modem interface device, an RS-232 interface device, etc. This permits the portable computer 20 to achieve a wide variety of functions without requiring additional space.

Figure 4:
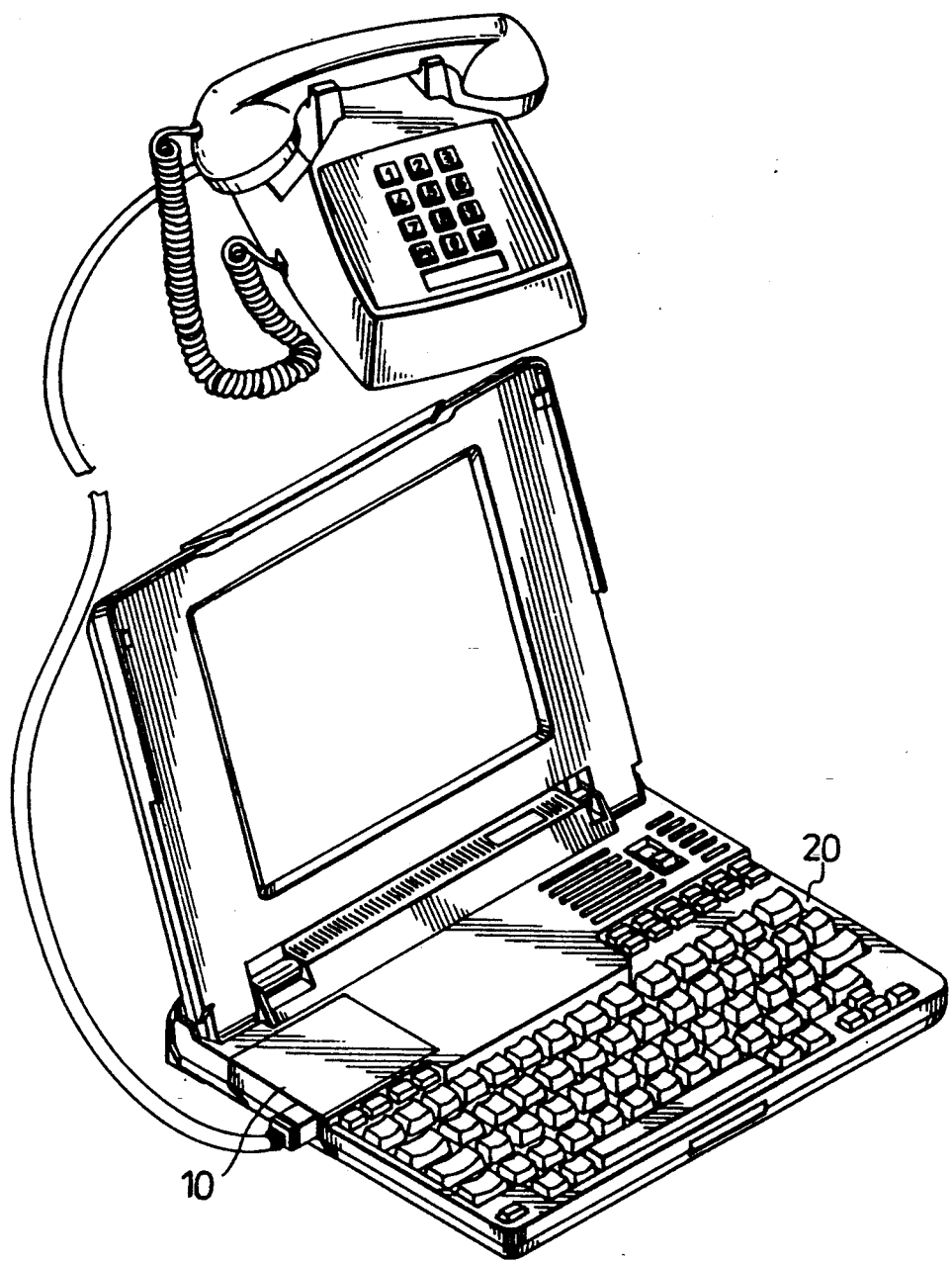
FIG. 4 illustration of the preferred embodiment when in use.

FIG. 4 is an illustration of one of the many applications of the preferred embodiment. The interface device 10 is a modem interface device 10 used to electrically connect a telephone unit to the portable computer 20.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A portable computer comprising a computer casing, a socket connector being provided on said computer casing and being electrically connected to internal circuitry confined by said computer casing, a rectangular receiving space in said computer casing accessible from one side thereof, said socket connector projecting inwardly into said receiving space from an innermost end of said receiving space, said portable computer further comprising a detachable interface device having a rectangular casing, said rectangular casing having a size corresponding to that of said receiving space and a rear end provided with a rectangular opening, said rectangular casing confining an interface card therein, said interface card having one end aligned with said rectangular opening, said socket connector extending into said rectangular opening to engage said one end of said interface card so as to electrically connect said interface device and said internal circuitry, a base plate disposed on a bottom side of said receiving space and having a rectangular notch opening on an outermost end of said receiving space, said rectangular casing having a bottom wall with a downwardly extending projection slidingly received in said rectangular notch and said base plate and said bottom wall of said rectangular casing are provided with aligned threaded holes when said interface device inserted into said receiving space whereby a threaded member can be threaded into said aligned holes to lock said interface device into said computer casing, the front end of said rectangular casing being provided with socket means to permit electrical connection of said portable computer with an external device.

* * * * *